United States Patent [19]

Leibold

[11] 3,994,360
[45] Nov. 30, 1976

[54] SAFETY SHUT-OFF FUEL SYSTEM

[75] Inventor: Richard E. Leibold, Detroit, Mich.

[73] Assignee: Colt Industries Operating Corporation, New York, N.Y.

[22] Filed: June 6, 1975

[21] Appl. No.: 584,598

[52] U.S. Cl. .............................. 180/104; 137/38
[51] Int. Cl.² ................. B60K 15/08; B60K 28/00
[58] Field of Search ............... 180/82 R, 103, 104; 123/198 D, 198 DB; 137/38, 39, 43

[56] References Cited
UNITED STATES PATENTS

| 406,290 | 7/1889 | Murdock | 137/38 |
|---|---|---|---|
| 1,302,749 | 5/1919 | Yeamans | 137/38 |
| 1,789,110 | 1/1931 | Muehleisen | 180/104 |
| 2,163,988 | 6/1939 | Stacey | 180/104 X |
| 2,619,185 | 11/1952 | Rudisill | 180/104 |
| 2,676,708 | 4/1954 | Risk | 137/38 X |
| 3,521,652 | 7/1970 | Reeks | 123/198 D X |
| 3,807,423 | 4/1974 | Engel | 180/104 X |
| 3,840,036 | 10/1974 | Renk | 137/38 |
| 3,910,301 | 10/1975 | Kuss | 137/38 |
| 3,915,255 | 10/1975 | Springer | 180/104 |

Primary Examiner—M. H. Wood, Jr.
Assistant Examiner—Terrance L. Siemens

[57] ABSTRACT

An automotive fuel system which has a fuel tank, a fuel pump, a fuel metering device for metering fuel flow to an associated fuel-consuming engine, and a fuel reservoir (such as, for example, a carburetor fuel bowl), has a valving assembly interposed generally between the outlet of the fuel pump and the fuel reservoir with such assembly being responsive to, for example, the associated vehicle experiencing a crash impact or a roll-over condition whereupon such valving assembly becomes effective to prevent the further flow of fuel from the fuel pump into the fuel reservoir.

2 Claims, 6 Drawing Figures

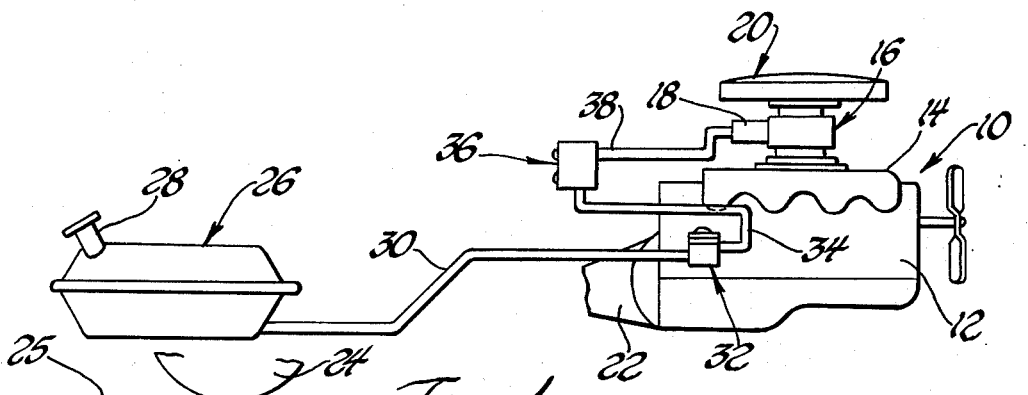
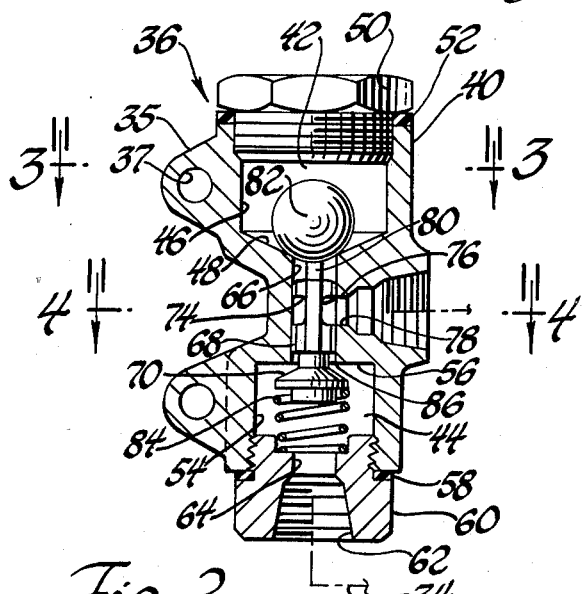
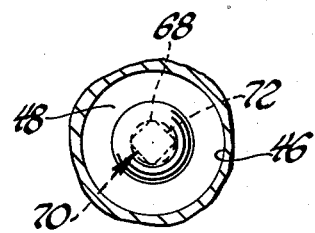
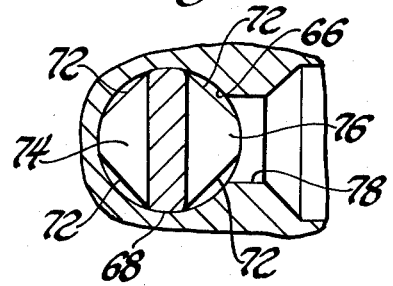
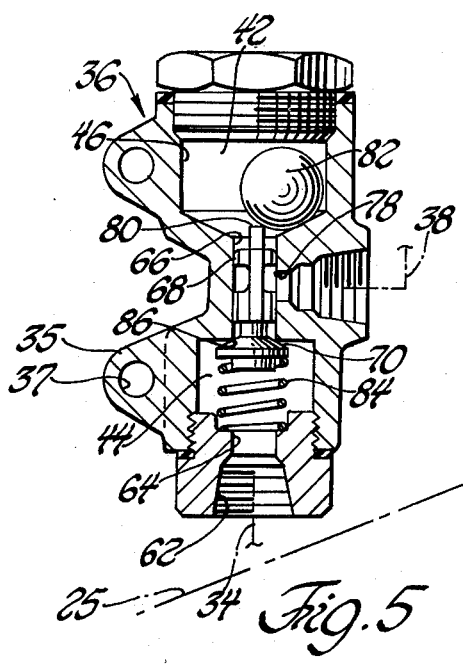
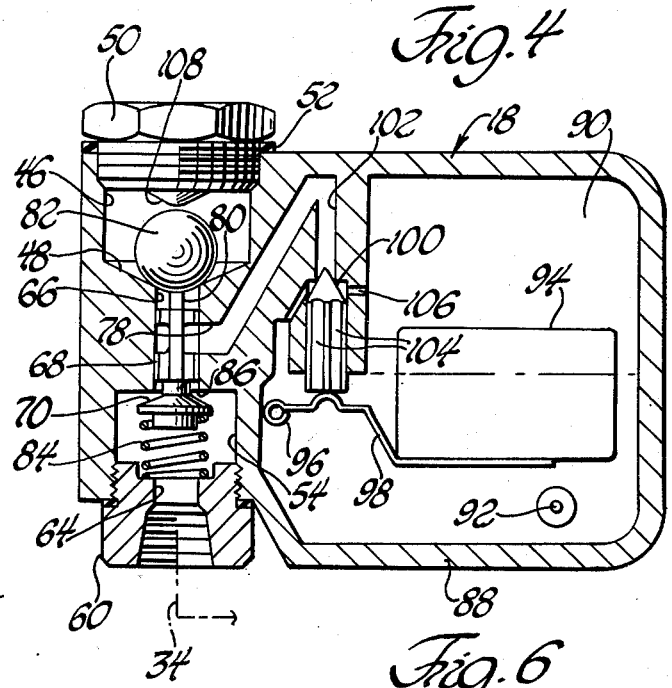

3,994,360

SAFETY SHUT-OFF FUEL SYSTEM

BACKGROUND OF THE INVENTION

Generally, automotive vehicles, whether automobiles, trucks or buses, have a relatively high degree of stability even in situations where they are struck from the side by another vehicle at a relatively high velocity. The stability and resistance to such struck vehicle turning over is due to such factors as the relatively heavy weight of the vehicle, its relatively low center of gravity as well as the relatively wide lateral wheel spacing. However, a very small percentage of such automotive vehicles involved in crashes do, nevertheless, turn or roll over or otherwise severely change their attitude from what would be considered normal.

It has, for many years, been accepted practice to, in automotive vehicles, provide a fuel tank from where a fuel pump would draw fuel and in turn supply such fuel to, for example, a fuel metering device on a remotely situated engine.

Often times such fuel metering devices take the form of a carburetor with an associated fuel bowl including a float-valve assembly therein. In many such arrangements there is a vent passage which in effect serves to complete communication as between the interior of the fuel bowl (above the fuel contained therein) and a source of ambient atmosphere as, for example, some point or area within and downstream of the engine intake air cleaner.

Of the very small percentage of such automotive vehicles which do turn over, roll-over or otherwise severely change their attitude it has been found that a further small percentage thereof have had fuel spill out of the vent tube or passage (or other passages communicating with the engine intake system) and flow over the engine and associated structure. In such instances, after investigations, it has been determined that because of the particular physical attitude or position assumed by the struck vehicle the fuel tank may actually assume an elevation above that of the carburetor fuel bowl. Because of such a change in relative elevations the liquid pressure head of the fuel within the fuel tank becomes sufficient to cause fuel to flow through the fuel pump (even though the fuel pump may not be operating) and into the carburetor fuel bowl from where such fuel, as previously indicated, can spill over onto the engine and associated structure. Such spilled fuel can, in turn, under circumstances giving rise to such a condition, ignite with the resulting flames being capable of starting the entire vehicle to burn.

Even though the occurence of such crash situations leading to such fuel-caused fires is rare, nevertheless, the invention as herein disclosed and described is directed to the solution of such as well as other attendent and related problems.

SUMMARY OF THE INVENTION

According to the invention, an automotive fuel system comprising a fuel tank, a fuel pump for pumping fuel from the tank to an associated fuel metering device which in turn meters fuel to an associated engine, has valving means effective for automatically preventing further fuel flow from the fuel tank and fuel pump to the associated fuel metering device upon the associated vehicle sustaining, for example, a crash impact or a severe change in its attitude as, for example, rolling over.

Various general and specific objects and advantages of the invention will become apparent when reference is made to the following detailed description considered in conjunction with the acompanying drawings.

BRIEF DESCRIPTION OF THE DRAWINGS

In the drawings, wherein for purposes of clarity certain details and elements may be omitted from one or more views:

FIG. 1 is a side elevational view depicting the general arrangement of an automotive fuel system employing the teachings of the invention and associated fuel consuming engine;

FIG. 2 is a generally longitudinal cross-sectional view, in enlarged scale, of the valve assembly depicted in elevation in FIG. 1;

FIG. 3 is a fragmentary cross-sectional view taken generally on the plane of line 3—3 of FIG. 2 and looking in the direction of the arrows;

FIG. 4 is an enlarged fragmentary cross-sectional view taken generally on the plane of line 4—4 of FIG. 2 and looking in the direction of the arrows;

FIG. 5 is a view similar to FIG. 2 but illustrating the valve assembly in a closed or shut-off condition; and FIG. 6 is a cross-sectional view through a fuel bowl or fuel reservoir, for a carburetor or other fuel metering device, employing the teachings of the invention.

DETAILED DESCRIPTION OF THE PREFERRED EMBODIMENTS

Referring now in greater detail to the drawings, FIG. 1 illustrates an automotive engine 10 as being comprised of an engine block or housing 12 with an intake manifold 14 and a fuel metering device 16 situated generally thereatop. For purposes of discussion, the fuel metering device 16 may be considered to be a carburetor with an associated fuel reservoir or fuel bowl assembly 18 associated therewith. An air clean assembly 20 serves to filter the ambient air being supplied to the intake of the carburetor 16.

A power output transmission assembly 22 may be employed for providing power to the vehicular ground-engaging drive wheels such as fragmentarily depicted at 24.

A fuel tank assembly 26 usually remotely situated with respect to the engine 10, is provided with a fuel filter pipe or tube 28 and has fuel supply conduit means 30 leading from the tank assembly to the inlet or intake of a related fuel pump assembly 32. The fuel pump assembly may be of any type (many of which are very well known in the art) and may be driven electrically or mechanically as by a direct mechanical connection with the engine assembly 10.

The outlet or discharge of the fuel pump 32 has conduit means 34 leading from there to the inlet of a valve assembly 36 which, in turn, has its outlet connected to conduit means 38 leading to the inlet of the fuel bowl assembly 18.

Generally, during normal operation, fuel supplied by tank assembly 26 to pump 32 is thereby pumped through valve assembly 36 and into the fuel bowl assembly 18 which may, in turn, employ float actuated and controlled inlet valving means for assuring the admission of only that quantity of pumped fuel as is necessary to maintain a preselected desired level of fuel within such fuel bowl for desired metering characteristics and performance. It should also be mentioned that even though pump assembly 32 is illustrated as being externally of tank assembly 26, such pump assembly, as is also generally well known in the art, may in fact be located internally of the tank assembly.

Referring to FIG. 2, the valve assembly 36 is illustrated as comprising a housing or body 40 first and second chambers 42 and 44 formed therein. The first or upper chamber 42 is preferably formed with a cylindrical side wall 46 terminating at its lower end in a conical surface 48 and closed at its upper end as by a threaded plug 50 and cooperating annular seal 52. The second or lower chamber 44 may also be defined as by a cylindrical side wall 54 terminating at its upper end as in an end wall 56 and being generally closed at its lower end as by an annular seal 58 and a threaded adapter 60 which, in turn, may be internally threaded as at 62 for the threadable reception therein of suitable conduit connecting means for operatively connecting thereto one end of conduit means 34. A passageway or conduit portion 64 formed in adapter 60 serves to complete communication as between conduit means 34 and chamber 44.

A passageway 66 formed through body 40 extends generally between chambers 42 and 44 and slidably contains therein a stem or guide portion 68 of a valve member 70. As generally also illustrated in FIGS. 3 and 4 the guide portion 68 may be of a generally diamond shape, in transverse cross-section, as to provide for longitudinally extending flatted surfaces 72 which, in turn, provide for space between such flatted surfaces and passage or guide-way 66. Further, in the preferred embodiment, transverse slots 74 and 76 are formed in the guide body 68 as to better assure communication with outlet conduit means 78, formed in housing 40, regardless of possible angular rotation of valve member 70 about its longitudinal axis within bore 66. The upper end of valve guide body 68 is provided with an extension 80 which, under normal conditions, is held in abutting relationship to a ball weight 82 contained within upper chamber 42 and seated on the conical surface 48. A spring 84, contained generally within lower chamber 44, operatively engages valve member 70 and resiliently urges such valve member 70 toward seated engagement with a cooperative valve seat 86. During normal operating conditions, the weight of ball 82 is sufficient to maintain ball 82 substantially in the position illustrated and to overcome the force of spring 84 tending to move valve 70 upwardly. Consequently, fuel supplied via conduit means 34 to chamber 44 flows past open valve 70 into passage 66 (between flatted surfaces 72 and the passage 66) and out through conduit means 78 and 38 to the fuel bowl assembly 18.

For purposes of illustration let it be assumed that the associated vehicle has sustained an impact, as by a collision, and because of it has come to rest in a position wherein its engine 10, fuel metering device 16 and fuel bowl 18 are disposed at an elevation lower than that of the fuel tank assembly 26 and, further, that the normal horizontal ground line 25 is at an angle, relative to the valving assembly 36, as generally depicted by the phantom line in FIG. 5.

With reference to FIG. 5, it can be seen that because of the impact and/or severe change in attitude of the vehicle, ball weight 82 has been moved off to the side of pin-like extension 80 thereby eliminating the resistance to upward movement of valve 70 by spring 84. As a consequence of the ball weight 82 being thusly displaced, spring 84 moves valve 70 upwardly against coacting seat 86 and thereby prevents further flow of fuel from chamber 44 into passage 66 and through conduit means 78 and 38.

As the valve guide body 68 and extension 80 thusly move upwardly, the effective height of extension 80 is sufficient to prevent ball weight 82 from rolling back and depressing extension 80 to open valve 70.

The valving assembly 36 may, of course, be situated in any suitable location on the associated vehicle. To this end, suitable mounting tabs 35 and apertures 37 are provided on body 40. However, generally, the closer that such valve assembly 36 is located to the point or points of discharge of fuel to the engine 10, the better the overall results would be because if any fuel line between the valve assembly 36 and the engine 10 would have a tendancy to drain, the volume of such fuel available to so drain would be minimized.

FIG. 6 illustrates an arrangement whereby the valve assembly 36 is integrally incorporated into the structure defining a fuel reservoir or fuel bowl as may be employed with a related fuel metering device such as, for example, a carburetor. In FIG. 6, all elements like or similar to those of any or all of FIGS. 1–5 are identified with like reference numbers.

The fuel bowl assembly 18 is typically illustrated as having a body or housing 88 which provides for a fuel containing chamber 90 communicating with related metering restriction means 92 leading, ultimately, as to engine 10. A float 94, hinged as at 96 by a float arm 98, serves to urge a related fuel inlet shut-off needle valve 100 upwardly, toward its closed position, as the level of fuel within chamber 90 increases. As shown, conduit means 102 communicates with conduit portion 78 and the flow therethrough is regulated by the position of needle valve 100. Although the needle valve 100 may be axially flatted along portions 104 of its outer body surface, to provide for flow past it, additional discharge passages 106 may also be provided for directing admitted fuel flow to chamber 90.

As should be apparent, not only is the weight of ball weight 82 sufficient to normally overcome the force of spring 84, but the angle of the ramp surface defined by the conical surface 48 is selected to be of a magnitude to be sufficient to prevent ball 82 from being displaced from its position shown in FIG. 2 during normal conditions of vehicle operation. If desired, the lower end of upper plug 50 may carry a downwardly directed conical surface 108 which generally compliments surface 48 to thereby define between such surfaces 48 and 108 an annular chamber having sloped upper and lower end walls. The apex of surface 108 would preferably be spaced a short distance away from the top of ball 82, when in its normal position, to prevent its upward movement during normal vehicle operation but yet enable the ball 82 to move eccentrically of valve extension 80, within the general confines of surfaces 108 and 48 as a consequence of a high order of vehicle impact, or the vehicle rolling over, or having the vehicle attain an attitude such as generally described and depicted in FIG. 5.

Although only a preferred embodiment and select modifications of the invention have been disclosed and described, it is apparent that other embodiments and modifications of the invention are possible within the scope of the appended claims.

I claim:

1. In a vehicle having a fuel consuming engine, the combination comprising fuel tank means, fuel metering means for metering the rate of flow of said fuel to said engine, fuel pump means effective for supplying a flow of said fuel from said fuel tank means to said fuel metering means, and safety valving means effective for at times preventing flow of said fuel from said fuel tank means to said fuel metering means, said safety valving means being thusly effective upon said vehicle experiencing a crash condition, said safety valving means comprising housing means, fuel inlet means formed in said housing means, fuel outlet means formed in said housing means, fuel passage means interconnecting said fuel inlet and outlet means, said fuel passage means comprising valve seat means, movable valve member means adapted to at times close against said valve seat means to thereby terminate flow of said fuel from said fuel inlet means to said fuel outlet means, and gravity responsive means normally effective for maintaining said valve member means away from said valve seat means to thereby complete communication through said passage means between said inlet and outlet means, said gravity responsive means being effective upon said vehicle experiencing said crash condition to permit said valve member means to close against said valve seat means, said gravity responsive means comprising a relatively heavy ball-like member, said housing means comprising chamber means, said chamber means comprising a lower disposed wall of generally depressed contour, wherein said ball-like member is contained within said chamber means and in normally a first position generally seated on said lower disposed wall, said ball-like member being effective when in said first position too operatively engage said valve member means to thereby maintain said valve member means away from said valve seat means, said ball-like member also being effective to be moved to a second position generally eccentrically disposed to said first position upon said vehicle experiencing said crash condition, said ball-like member when moved to said second position being ineffective to maintain said valve member means away from said valve seat means, said valve member means comprising an actuating extension, said ball-like member operatively engaging and depressing said actuating extension when said ball-like member is in said first position, and said actuating extension being effective to operatively engage said ball-like member and prevent said ball-like member from returning to said first position after said ball-like member has moved to said second position.

2. The combination according to claim 1 wherein said lower disposed wall comprises a downwardly depending generally conical surface with the widest portion thereof being situated relatively upper-most, said chamber means also comprising an upper wall having a surface configuration generally complimentary to said conical surface.

\* \* \* \* \*